Dec. 23, 1930.   J. W. SCHACHTER   1,785,878
TEAPOT
Filed Aug. 29, 1929
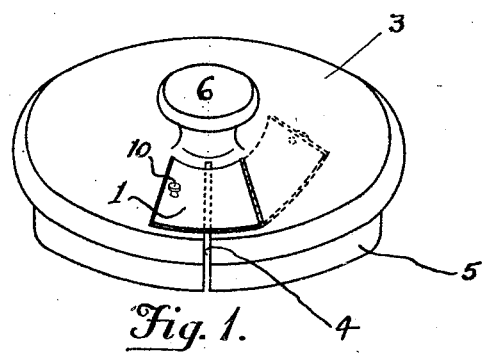
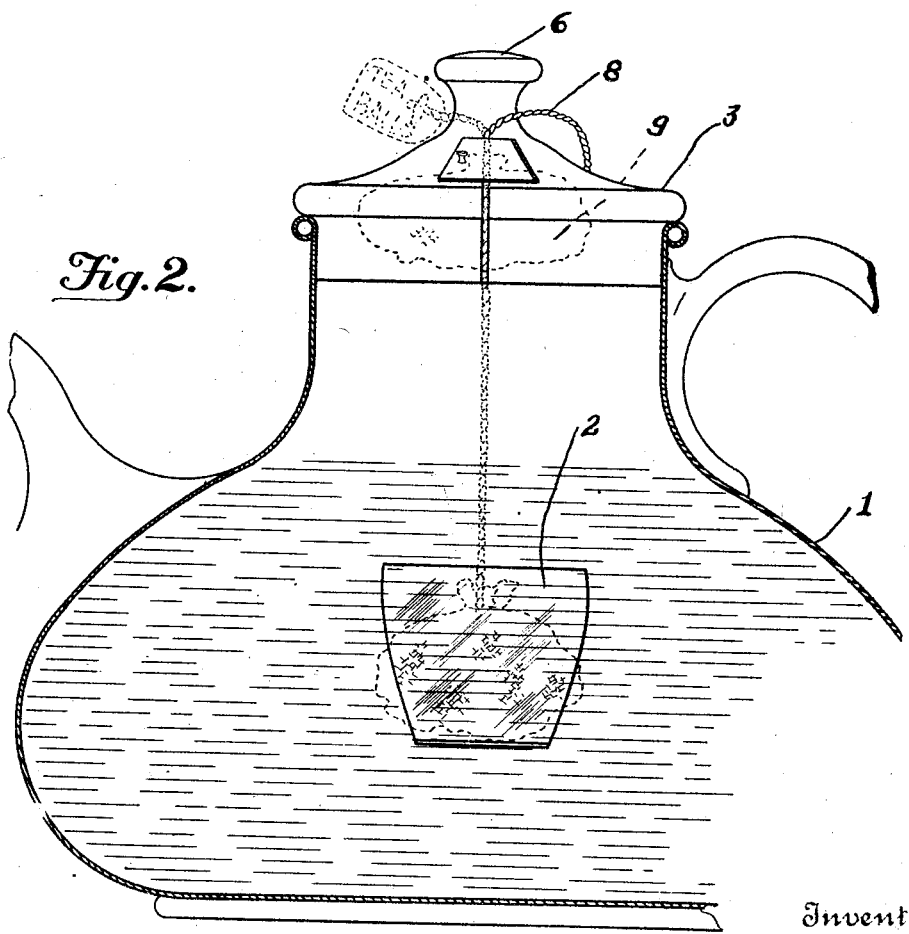
Inventor
Joseph William Schachter
By his Attorneys Patented Dec. 23, 1930

1,785,878

UNITED STATES PATENT OFFICE

JOSEPH WILLIAM SCHACHTER, OF BROOKLYN, NEW YORK

TEAPOT

Application filed August 29, 1929. Serial No. 389,110.

This invention relates to improvements in teapots, the principal object of the invention being to provide a teapot by means of which the usual bag of tea may be strung inside of the teapot cover and yet be maintained in dry condition until the person who is to drink the tea himself lowers the bag into the water.

A further object of the invention is to provide a teapot having a window whereby the strength of the tea may be observed before pouring it out of the pot.

Other objects and advantages of the invention will appear as the description proceeds.

In the drawing accompanying this specification,

Fig. 1 is a perspective view of a teapot cover embodying the features of the present invention; and Fig. 2 is a vertical sectional view through a teapot showing the cover in place, the bag of tea being shown in dotted lines let down into the water.

The same characters of reference designate the same parts in the different figures of the drawing.

Referring to the drawing, 1 designates a teapot which may be of metal, pottery or any other suitable material. The teapot is provided at opposite sides thereof with windows 2 of transparent material, said windows being disposed below the normal water-level in the pot whereby it is possible for the user to observe the strength of the tea before pouring it.

When serving tea it is customary to place the tea ball outside of the teapot containing the water in order that the user may be assured that he is getting a fresh ball. I have provided means whereby the ball may be enclosed within the cover of the teapot and yet maintained clear of the water so that the user may have the same assurance of being served with a fresh ball without exposing the tea ball outside of the pot. In the present instance the teapot cover 3, which may be hinged or not to the teapot as desired, is provided with a radial slit 4, extending inwardly from the lower edge of the pot-engaging lip or flange 5 to a point near the knob 6 of the cover. In order to prevent as much as possible the escape of steam through said slit, a lid 7 is in the present instance shown hinged to the cover and adapted to overlie and conceal that portion of the slit lying in the top of the cover, leaving uncovered only sufficient space at the inner end of the slit to permit the cord 8 from which the tea ball 9 is suspended to pass through and be held in position between the edge of said lid and the end wall of the slit. It will be understood, of course, that, instead of hinging the lid to the cover, it may be made to slide thereon radially of said cover. The material of the cover is preferably depressed at the place where the lid 7 overlies the slit so that when the lid is closed its outer surface will lie substantially flush with that of the cover.

The depth of the cover is preferably such that when the tea ball is pulled up into the cover it will be entirely within said cover, and thus protected from becoming wet during transit from the kitchen to the user.

The operation of the device is as follows: When tea has been ordered the waiter puts the proper quantity of boiling water into the teapot. He then raises the lid 7, which is preferably provided with a small knob 10 for this purpose, and slips the cord 8 into the slit 4 and pulls said cord up until the tea ball is in contact with the top or dome of the cover, whereupon, by closing the lid 7 the cord is clamped between said lid and the end of the slit 4 and the ball is thus prevented from dropping into the water. With the tea ball in this position the teapot is placed before the user, who may, if he desires to do so, raise the cover and examine the ball to make sure that it is a fresh one and after replacing the cover he may slightly lift the lid 7 thereby to permit the ball to drop into the water. After the tea has steeped for a few minutes, the user may observe the color of the water through one of the transparent windows to determine whether or not it is strong enough to suit his taste, and when it is sufficiently strong he may pull the cord so as to return the ball into the cover, where it will be held by the clamping action of the lid on the cord.

Having thus described my invention, what I claim is:

1. A teapot having a cover provided with a radial slit, and a lid hinged to said cover and disposed in position to overlie said slit for the greater part of its length, said lid being adapted to grip a tea ball-suspending-cord between one edge of the lid and the inner end wall of the slit.

2. A teapot having a cover provided with a radial slit and a depressed portion intersecting said slit, and a lid hinged to said cover and adapted to lie within said depressed portion, said lid being adapted to grip a tea ball-suspending-cord between one edge of the lid and the inner end wall of the slit.

3. A teapot having a cover provided with a radial slit, and a lid movably maintained on said cover in position to overlie said slit for the greater part of its length, said lid being adapted to grip a tea-ball suspending cord between one edge of the lid and the inner end wall of the slit.

In testimony whereof I have signed my name to this specification.

JOSEPH WILLIAM SCHACHTER.